F. E. HIRT.
DYNAMO ELECTRIC MACHINE.
APPLICATION FILED MAY 1, 1909.
931,606.
Patented Aug. 17, 1909.
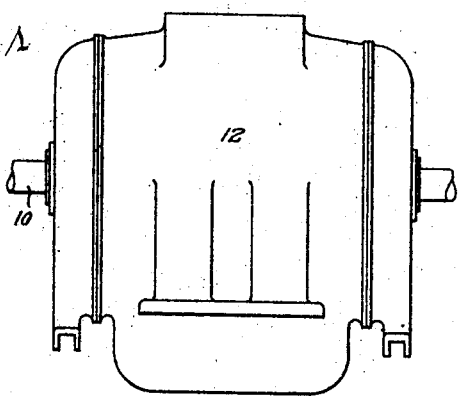
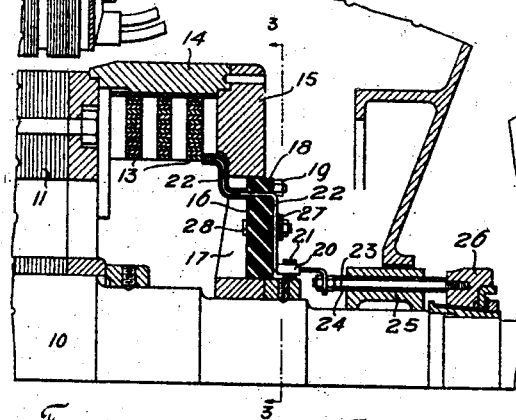
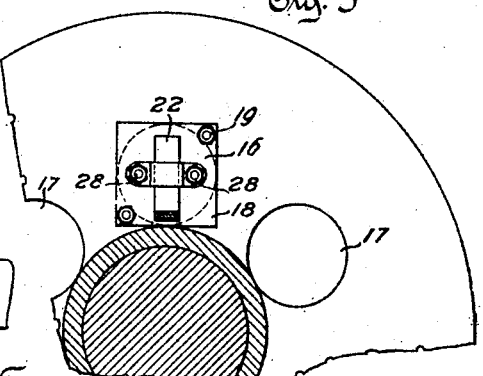
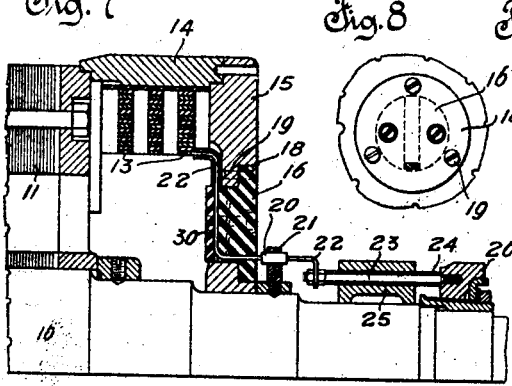
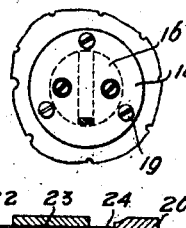
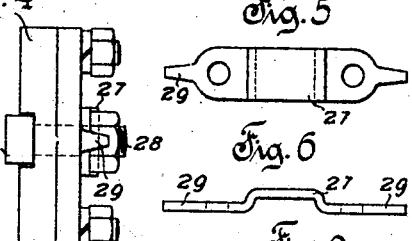
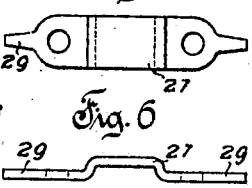
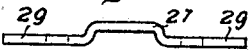
Witnesses
Rob. E. Stoll.
Chas. L. Byron.
Inventor
Fritz E. Hirt
By Chas. E. Lord
Attorney

UNITED STATES PATENT OFFICE.

FRITZ E. HIRT, OF MILWAUKEE, WISCONSIN, ASSIGNOR TO ALLIS-CHALMERS COMPANY, A CORPORATION OF NEW JERSEY.

DYNAMO-ELECTRIC MACHINE.

No. 931,606.   Specification of Letters Patent.   Patented Aug. 17, 1909.

Application filed May 1, 1909. Serial No. 493,400.

*To all whom it may concern:*

Be it known that I, FRITZ E. HIRT, a citizen of Switzerland, residing at Milwaukee, in the county of Milwaukee and State of Wisconsin, have invented certain new and useful Improvements in Dynamo-Electric Machines, of which the following is a full, clear, and exact specification.

My invention relates to dynamo-electric machines, and specifically to the rotors of turbo-generators.

One of the troublesome problems in turbo constructions is to obtain a proper support for the leads that connect the collector rings and the rotor windings. This is on account of the enormous centrifugal forces developed in the rotating members of turbo-generators, and the fact that the collector leads extend through spaces where they must be specially supported. A number of schemes have been proposed for supporting these collector leads. Such schemes have often been quite complicated, and have universally been very expensive.

It is the object of my present invention to provide an arrangement for supporting these collector leads which shall be at once simple in construction, effective in operation, and inexpensive to manufacture.

In carrying out my invention there is provided a block, preferably of insulating material, which is set into and firmly fastened in the end cover or end disk of the rotor, and the collector lead is led through a suitable opening in said block and approximately radially along the face thereof, the part of the collector lead which extends along the side of the block being suitably fastened thereto, as by a clamp. One of the holes usually provided in the end disks for ventilating purposes may conveniently be used for receiving this block.

The various novel features of my invention will appear from the description and drawing, and will be particularly pointed out in the claims.

Figure 1 is an elevation of a turbo-generator to which my invention is applicable, though it is also useful in other types of machines; Fig. 2 is a fragmentary longitudinal section through such machine, illustrating one application of my invention; Fig. 3 is a partial section on the line 3—3 of Fig. 2; Figs. 4, 5, and 6 are views illustrating details of construction; Fig. 7 is a view similar to Fig. 2, but showing a modification; and Figs. 8 and 9 show details of the modification.

The shaft 10 carries a rotor core 11 provided with a suitable winding and rotating within the stator 12. The winding of the rotor is located in slots in the rotor core and has end portions 13 which project beyond the ends of the core. These end portions are supported against the action of centrifugal force by means of rings 14, which rest on the core and on end disks 15. The rings 14 and end disks 15 form end covers for the projecting end portions 13. If desired, the end disks may be integral with the rings 14.

One or more blocks 16, preferably of insulating material, are nicely fitted in openings 17 in the end disks 15. These openings may be special openings or may be of the openings usually provided in the end disks for ventilating purposes. In the arrangement illustrated they are the latter. If there are but two terminals of the rotor winding, and these two terminals are connected respectively to slip rings at opposite ends of the machine, there will be but one of these blocks in each end disk. Otherwise, there will be more than one block in one end disk. Since the collector lead connections are all alike, it is sufficient to describe one of them.

The block 16 has an enlarged head 18 which may be either integral with the block as shown, or separate from the body of the block. The head 18 may be either round as shown in Fig. 7, in which case it is preferably countersunk in the end disk, or square as shown in Fig. 2, in which case its corner portions abut against the end disk. In either case the head 18 is firmly fastened to the end disk by means of screws 19.

In the arrangement shown in Figs. 2 to 6 inclusive, the collector lead 22 extends from the end portions 13 of the rotor winding through an axial opening in the disk 16 and its head 18, and thence substantially radially of the rotor across the face of the head 18. Thence it extends axially through an insulating sleeve 20 in the ring 21, and is bent inward and clamped between nuts at the end of the rod 23, which in turn extends through an insulating bushing 24 in the bushing ring 25 and into the collector ring 26. The part of the collector lead which extends radially along the block 16 is clamped to the block by a cleat 27 and two bolts 28.

The cleat 27 has projecting ends 29 which after the parts are firmly clamped are turned up to lock the nuts of the bolts 28 against movement.

In the arrangement shown in Figs. 7, 8, and 9 the collector lead 22 extends from the end portions 13 of the rotor winding radially inward along the inner face of the block 16, to which it is clamped by a cleat 30 and screws 31. After traversing practically the whole of the inner face of block 16, it bends and extends axially of the rotor through an opening in said block and through the insulating sleeve 20 in the ring 21, and is fastened to the rod 23 extending from the collector ring 26 in the same manner as in the arrangement shown in Fig. 2.

In both of the arrangements illustrated the collector lead is firmly supported throughout the greater part of its length, and is thus prevented from being distorted and perhaps ruptured by the action of centrifugal force. Both the arrangements illustrated serve their purpose effectually, and withal are simple and inexpensive to construct and install.

Many modifications may be made in the precise arrangement shown and described, and all such which do not depart from the spirit and scope of my invention I aim to cover in the following claims.

What I claim as new is:

1. In the rotor of a dynamo-electric machine, the combination of a shaft, a core mounted on the shaft, a winding carried by the core, an end cover, a block of insulation set in the end of said end cover, a collector ring, a collector lead connecting said winding and said ring and extending axially through an opening in said block and along one face of said block, and means for clamping to the block that part of the collector lead which extends along its face.

2. In the rotary member of a dynamo-electric machine, the combination of a shaft carrying a core, a winding, and a collector ring, an end cover for said winding having a plurality of openings through its end, a block of insulating material set in one of said openings, a collector lead connecting said collector ring with said winding and extending substantially radially along one face of said block and substantially axially of the machine through an opening in said block, and means for clamping said collector lead to said block.

3. In the rotary member of a dynamo-electric machine, the combination of a shaft, a core mounted on the shaft, a winding carried by the core and having end portions projecting beyond the core, an end cover for the projecting portions of the winding, a block of insulating material set in an opening through the end of said end cover, a collector ring, a collector lead joining said winding and said collector ring and extending from the end portions of the winding through an opening axially of the machine in said block and substantially radially of the machine across the face of said block, and means for clamping said radially extending portion of the lead to the face of said block.

4. In the rotary member of a dynamo-electric machine, the combination of a shaft carrying a core, a winding, and a collector ring, an end disk, a block of insulation fastened in an opening in said disk, a collector lead connecting said winding with said collector ring and extending along one face of the block and through an opening through the block, and means for clamping said lead to the block.

5. In the rotary member of a dynamo-electric machine, the combination of a shaft carrying a core, a winding, and a collector ring, an end disk, a block of insulation fastened in an opening in said disk, a collector lead connecting said winding with said collector ring and extending along one face of the block and through an opening through the block, a cleat for clamping said lead to said block, and bolts for fastening said cleat to the block.

6. In the rotary member of a dynamo-electric machine, the combination of a shaft carrying a core, a winding, and a collector ring, an end disk, a block of insulation fastened in an opening in said disk, a collector lead connecting said winding with said collector ring and extending along one end face of the block and through an opening through the block, a cleat for clamping said lead to said block, bolts for fastening said cleat to the block, and extensions on said cleat which are bent up to lock the nuts of said bolts.

7. In the rotary member of a dynamo-electric machine, the combination of a shaft carrying a core, a winding, and a collector ring, an end disk having an opening, a block fastened in said opening, collector leads connecting said winding with said collector ring and extending across one face of the block and through an opening through the block, and means for clamping the lead to the block.

In testimony whereof I affix my signature, in the presence of two witnesses.

FRITZ E. HIRT.

Witnesses:
H. C. CASE,
CHAS. L. BYRON.